Oct. 14, 1952 R. B. DOME 2,614,246

MODULATION SYSTEM

Filed Sept. 23, 1949 2 SHEETS—SHEET 1

Inventor:
Robert B. Dome,
by Milton D. [signature]
His Attorney.

Inventor:
Robert B. Dome,
by Merton D. Moore
His Attorney.

Patented Oct. 14, 1952 2,614,246

UNITED STATES PATENT OFFICE 2,614,246

MODULATION SYSTEM

Robert B. Dome, Geddes Township, Onondaga County, N. Y., assignor to General Electric Company, a corporation of New York Application September 23, 1949, Serial No. 117,360

11 Claims. (Cl. 332—41)

Figure 1:
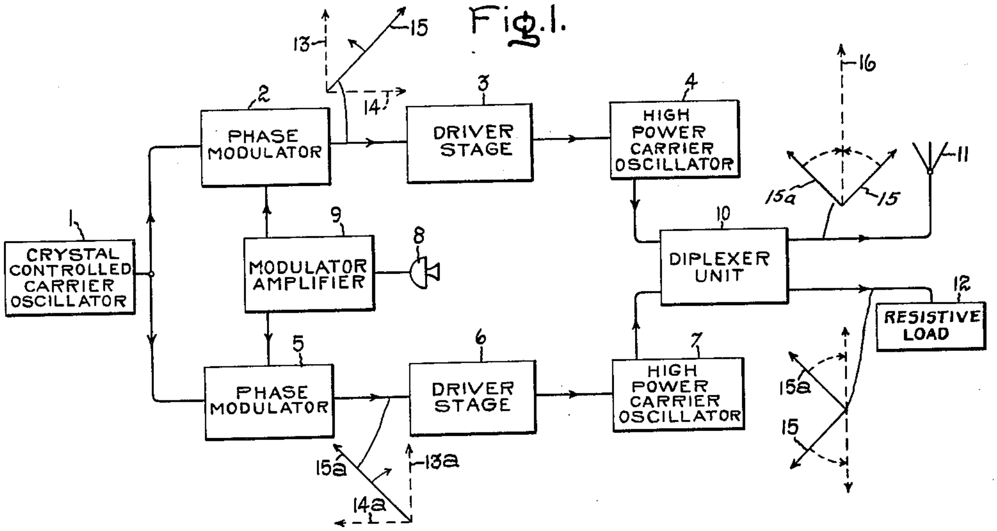

My invention relates to modulation systems, and, more particularly, to modulation systems which are adapted to provide an amplitude modulated output signal. While my invention is of general utility, it is particularly suitable for use at ultra-high frequencies in situations wherein an amplitude modulated carrier wave of high power may be required.

In certain instances, an ultra-high frequency carrier wave which is modulated in amplitude is required, and particularly an amplitude modulated ultra-high frequency carrier wave which is of relatively high power. Such a requirement is found in television transmitter systems wherein it is necessary to provide an amplitude modulated output wave for the picture signal. While certain arrangements heretofore proposed have utilized, triode oscillators as a source of amplitude modulated output power, these triodes have a relatively low power output at ultra-high frequencies, such as, for example the television frequency band from 475 megacycles of 890 megacycles. On the other hand, high power sources of considerably greater power than such triodes, which are suitable for use in the above mentioned ultra-high frequency range, such as the magnetron oscillator, do not lend themselves to amplitude modulation due to the changes in operating characteristics produced by changes in the amplitude of the oscillation during modulation. The amplitude modulation curve of such oscillators is very irregular and the magnetron oscillator will cease to oscillate if a large degree of modulation is employed. Accordingly, it is a primary object of my invention to provide a new and improved modulation system by means of which an output wave of high power may be obtained.

It is a further object of my invention to provide a new and improved modulation system in which a high power, ultra high frequency carrier wave which is modulated in amplitude may be obtained.

It is a still further object of my invention to provide a new and improved modulation system in which ultra high frequency oscillators of relatively high power are operated at constant amplitude and produce an amplitude modulated output wave.

It is another object of my invention to provide a new and improved modulation system in which ultra high frequency oscillators of relatively high power are crystal controlled and are operated at constant amplitude to produce an amplitude modulated output wave.

Briefly, in accordance with one phase of my invention, there is provided a crystal controlled source of carrier waves which is coupled to a pair of phase-modulators. Modulation voltage is applied to the phase modulators so that the outputs of the modulators are phase modulated in opposite senses. The low power phase-modulators are used to synchronize a pair of high power oscillators. Due to the relatively low power required for synchronism, a very high power oscillator may be controlled by a relatively low power phase-modulated driver and the phase modulation of the driver will be faithfully reproduced at high power. The high power oscillators are connected to a diplexer unit which has two independent output channels, one of which contains the sum and the other the difference of the two oscillator outputs. One of the output channels is connected to an antenna system and provides the useful output of the system, the other channel being connected to a dummy antenna.

On positive peaks of modulation, the antenna output will be a maximum and will be equal to the sum of the two high power oscillator outputs. At the positive peak of the modulation cycle no power is wasted in the dummy antenna. By such a system, the high power oscillators are effectively crystal controlled and operate at a constant amplitude of oscillation but produce an amplitude modulated output wave having a peak power equal to the sum of the power outputs of the high power oscillators.

Figure 2:
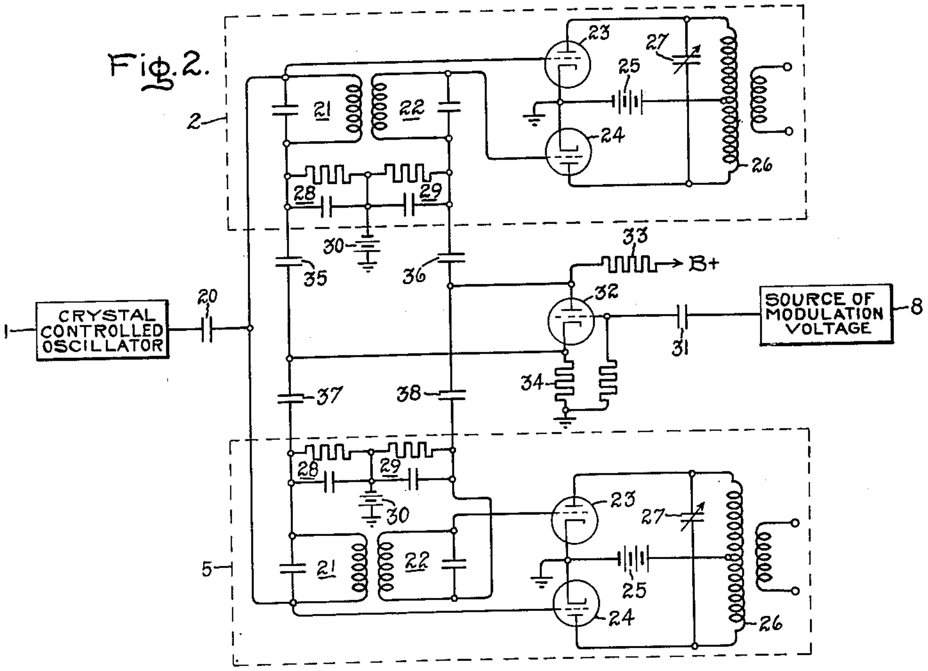
Figure 3:
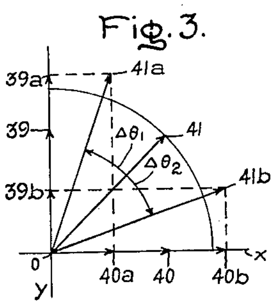
Figure 4:
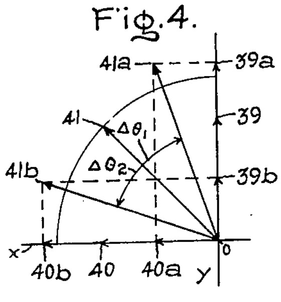
Figures 5, 6, 7, 8:
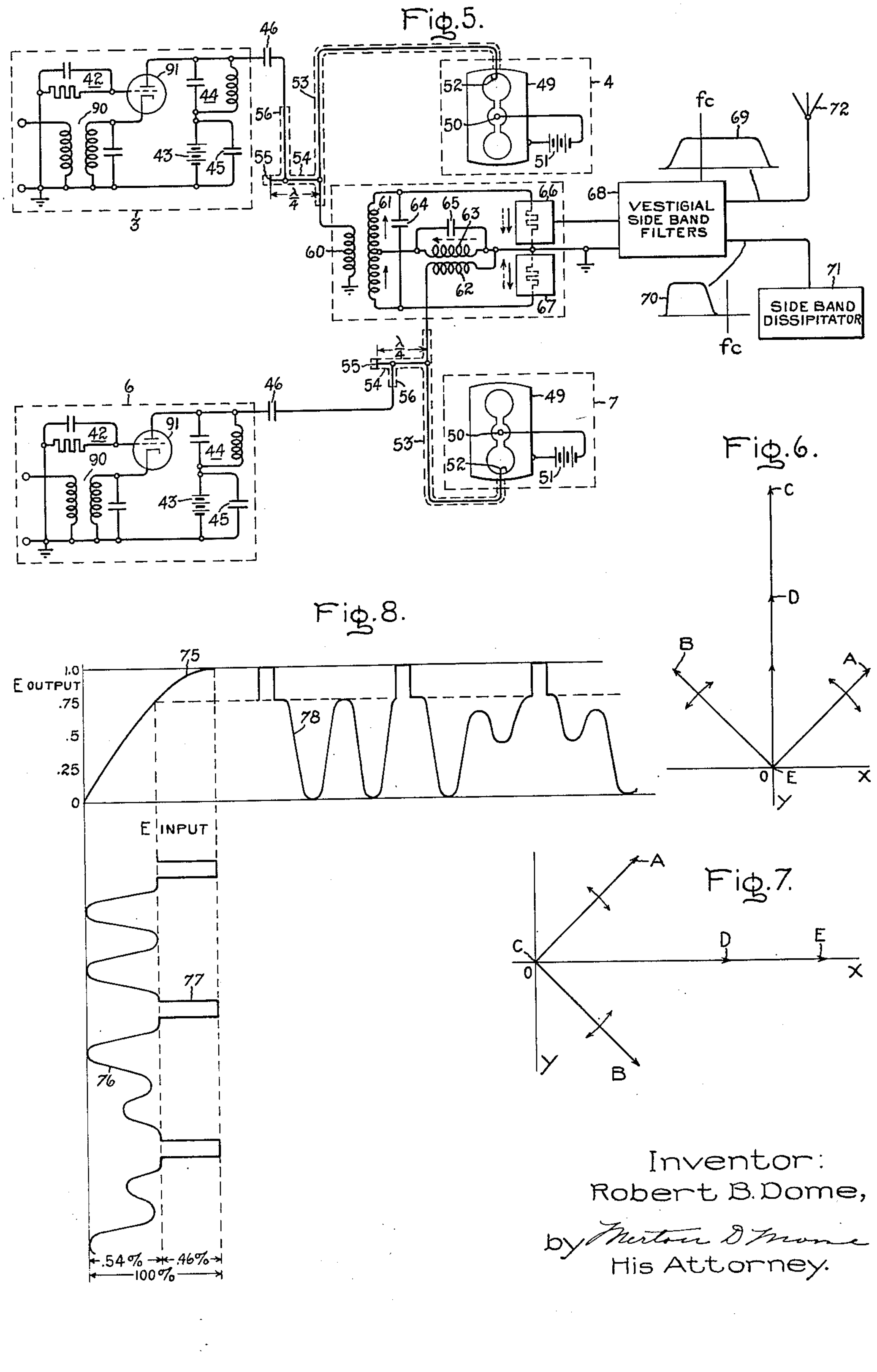

The features of my invention which I believe to be novel are set forth with particularity in the appended claims. My invention itself, however, both as to its organization and method of operation, together with further objects and advantages thereof, may best be understood by reference to the following description taken in connection with the accompanying drawings in which Fig. 1 is a block diagram of a modulation system constructed in accordance with the principles of my invention; Fig. 2 is a schematic diagram of a portion of the system of Fig. 1; Figs. 3 and 4 are vector diagrams which illustrate the operation of the circuit of Fig. 2; Fig. 5 is a schematic diagram of another portion of the circuit of Fig. 1; Figs. 6 and 7 are vector diagrams which illustrate the operation of the circuit of Fig. 5; and Fig. 8 is a characteristic curve of a portion of the circuit of Fig. 1.

Referring now to the modulation system which is shown in block diagram form in Fig. 1, oscillations at carrier frequency are produced by a crystal controlled oscillator 1. The output of crystal oscillator 1 is connected to a first phase modulator 2, to which are connected in cascade relation in the order named, a driver stage 3, and a high power oscillator 4. The output of crystal oscillator 1 is also connected to a second phase modulator 5, to which are connected in cascade relation in the order named, a driver stage 6, and a high power oscillator 7. A source of modulation voltage, which has been illustrated by the microphone 8, is connected to a modulation amplifier 9, the output of modulation amplifier 9 being connected to the phase modulators 2 and 5. The outputs of high power oscillators 4 and 7 are connected to a diplexer unit 10, one output channel of diplexer 10 being connected to an antenna system 11 and the other output channel of diplexer 10 being connected to a resistive load 12.

Considering the operation of the above described system as a whole, oscillations which are produced at carrier frequency in the crystal controlled oscillator 1 are coupled to the input circuit of phase modulators 2 and 5. In the input circuit of phase modulator 2 the oscillator voltage is shifted by 90° to provide two components of voltage which are indicated by the dotted vectors 13, 14 the voltages 13, 14 being combined in the output of the phase modulator 2 to derive a resultant voltage indicated vectorially at 15. Modulation voltage from the amplifier 9 is supplied to the phase modulator 2 in such a manner as to vary the amplitude of voltages 13, 14 in opposite directions so as to produce a phase rotation of the resultant voltage 15, positive modulation voltage operating to shift the voltage 15 in the direction of the arrow shown in the drawing. The limits of modulation are set so that the maximum phase rotation of resultant voltage 15 is 90°. On positive peaks of modulation, the voltage 15 will be coincident with the vertical axis and on negative peaks of modulation the voltage 15 will be coincident with the horizontal axis.

The oscillator voltage from oscillator 1 is also supplied to the input circuit of phase modulator 5 and is shifted in phase to produce two 90° opposed vectors 13*a* and 14*a*. The component voltages 13*a*, 14*a* are combined to produce a resultant voltage 15*a* in the output circuit of phase modulator 5. It will be noted that the polarity of component voltage 14*a* has been reversed from its polarity in phase modulator 2 so that the resultant voltage 15*a* is displaced 90° from the resultant voltage 15 produced in the output of phase modulator 2.

The modulation voltage from amplifier 9 is supplied to phase modulator 5 so that positive modulation causes the resultant voltage 15*a* to rotate in the direction of the arrow shown in the drawing. Due to the reversed polarity of vector 14*a* the direction of rotation is opposite to the rotation of voltage 15 and therefore the outputs of the phase modulators 2, 5 are phase modulated in opposite senses. It may be mentioned here that suitable frequency multiplier stages may be included between the phase modulator stages 2, 5 and the driver stages 3, 6. Such frequency multiplier stages may be useful in the event that a low frequency crystal controlled oscillator 1 is to be employed.

The driver stages 3, 6 receive the phase modulated output of the phase modulators 2, 5, or the outputs of suitable frequency multipliers therefrom, and provide sufficient output power to drive the high power carrier oscillators 4, 7. The high power carrier oscillators 4, 7 are operated at the desired carrier frequency and are of suitable construction so that they may be synchronized by the driver stages over the entire frequency range of the phase modulated driver voltages. The driver stages 3, 6 are connected to the high power carrier oscillators 4, 7 through a suitable network to be described more fully hereinafter.

A relatively low power driver voltage is satisfactory to lock the high power carrier oscillator in synchronism therewith so that the phase modulated voltages 15, 15*a* are reproduced at the outputs of the carrier oscillators 4, 7 at the high power output level of the carrier oscillators.

A diplexer unit 10 is used to combine the constant amplitude outputs of the high power carrier oscillators 4, 7 so as to obtain an amplitude modulated output wave therefrom. The diplexer 10 is preferably a unit wherein the outputs of the carrier oscillators may be combined without interaction upon the individual oscillator circuits themselves. The diplexer unit 10 is provided with a pair of independent output channels, one of which channels is equal to the sum of the high power oscillator output voltages and the other of which channels is equal to the difference of the two output voltages. The channel of diplexer 10 which contains the sum of the carrier oscillator outputs is illustrated in Fig. 1 as being connected to the antenna system 11.

Inasmuch as the high power carrier oscillators 4, 7 are synchronized with the output from the phase modulators 2, 5, we may represent the outputs of the carrier oscillators as vectors 15 and 15*a* which in their unmodulated positions are in 90° phase relationship. Upon positive peaks of modulation the vectors 15 and 15*a* will be rotated by the maximum amount, in opposite directions, so that they both fall on the same ordinate and will produce an output voltage which is the sum of the two carrier oscillator outputs as is illustrated by the dotted vector 16. However, on positive peaks of modulation the difference voltage in the other channel of the diplexer unit is equal to zero. This is readily apparent when it is seen that the vector 15 is displaced 180° when the difference voltage is obtained and the two voltages 15 and 15*a* rotate in opposite directions so as to produce, at the positive peak of modulation, equal vectors which are of opposite phase. Thus, during positive peaks of modulation there is no power being dissipated in the resistive load 12 and the power being radiated from the antenna system 11 is equal to the sum of the power outputs of both high power oscillators.

Having considered generally a complete modulator system, its various parts may now be considered in detail. The following description of the detailed figures should be read in connection with the block diagram of Fig. 1 as well as the detailed illustrations of the other figures. In order to illustrate more completely the operation of the phase modulators 2, 5 and the way in which oppositely sensed phase modulated voltages may be obtained therefrom, I have illustrated in Fig. 2 a circuit diagram of this portion of the circuit of Fig. 1. Referring to Fig. 2, the output of crystal controlled oscillator 1 is illustrated as connected through a coupling capacitor 20 to a first tuned circuit 21 which is resonant at the oscillator frequency. Tuned circuit 21 is coupled to a second tuned circuit 22 which is also resonant to the oscillator frequency. Due to the fact that the tuned circuits 21, 22 are resonant to the same frequency and are coupled together, the voltages produced thereacross at resonance will be 90° out of phase. The voltage produced across the first tuned circuit 21 will be 90° out of phase with respect to the voltage produced across the second tuned circuit 22. The voltages across tuned circuits 21, 22 are supplied to the control electrodes of modulator tubes 23, 24. The anode circuit of tubes 23, 24 are connected to a source of unidirectional potential 25 through a center tapped transformer 26 which is also tuned to the carrier frequency by means of a capacitor 27. The other end of tuned circuits 21, 22 is connected through filter networks 28, 29 to ground through a source of biasing potential 30.

The source of modulation voltage 8 is connected through a coupling capacitor 31 to the control electrode of an electron discharge device 32, device 32 being operated as a phase inverter stage. The outputs from the anode load resistor 33 and cathode load resistor 34 of the phase inverter stage are connected through coupling capacitors 35, 36 to the junction points of tuned circuits 21, 22 and the filter circuits 28, 29. The phase modulator 5 is substantially identical to the phase modulator 2 and similar reference numerals of identical elements therein have been applied thereto. The modulation voltage from the phase inverter 32 is supplied to the filter circuits 28, 29 of phase modulator 5 through the capacitors 37, 38.

In considering the operation of phase modulator 2 during the modulation cycle thereof, reference is now had to Fig. 3 wherein there is illustrated a vector diagram of the various voltages associated therewith. The voltages produced across tuned circuits 21 and 22 are illustrated vectorially by the voltages 39 and 40, these vectors combining in the output circuit of the modulator to provide a resultant voltage 41. In the absence of modulation, voltage 41 will be at 45° phase angle with respect to the voltages 39, 40. However if the modulation voltage is positive so as to produce a positive voltage across filter circuit 28 and a negative voltage across filter circuit 29, the voltage 39 will be increased to a value indicated by the vector 39*a* and the voltage 40 will be decreased to a value indicated by the vector 40*a*. The resultant voltage in the output of the modulator is thus rotated in phase by an amount $\Delta\theta_1$ to the new position illustrated by the vector 41*a*. However, if the modulation voltage is negative so that a negative voltage appears across filter circuit 28 and a positive voltage appears across filter circuit 29 the situation is reversed so that the resultant voltage 41 is rotated in the opposite direction by an amount $\Delta\theta_2$ to the position illustrated by the vector 41*b*.

In Fig. 4 there is illustrated vectorially the voltages associated with the phase modulator 5. In Fig. 4 vectors produced under similar conditions as those in Fig. 3 have been indicated by the same reference numerals. It will be noted that the vector 40 is illustrated as reversed 180° in phase with respect to the position in Fig. 3. This may be conveniently obtained by reversing the connections of tuned circuit 22 so that the voltage produced thereacross is reversed in phase, or by any other suitable phase reversing means. With the voltage 40 of opposite phase, the resultant voltage 41 lies in the second quadrant and in the absence of modulation will have a 45° phase relationship with respect to the component voltages 39, 40. A positive modulation voltage rotates the resultant voltage 41 in the opposite direction from that of Fig. 3 as will be apparent by a comparison of the vectors of the two figures.

While I have indicated the phase modulators 2, 5 as being of a particular type, it will be understood that various other types of phase modulators may be employed with satisfactory results. The only requirement which must be maintained is that the resultant phase modulator output voltages must be modulated in opposite senses and the phase relationship of one of the components of the resultant voltage of one phase modulator must be reversed so as to provide the 90° opposed resultant voltages 41 shown in Figs. 3 and 4.

In Fig. 5 there is illustrated the high power section of the modulator system together with the driver stages 3, 6 therefor. Referring to Fig. 5 the output from phase modulator 2 is supplied to the primary of an input transformer 90 which is included in the driver stage 3. The tuned secondary of transformer 90 is coupled to the cathode of a driver tube 91, the control electrode of driver tube 91 being connected to ground through a time constant network 42. The anode of driver tube 91 is connected to a unidirectional source of potential 43 through a tuned anode circuit 44, the battery 43 being bypassed by a capacitor 45. It will be evident that the driver stage 3 is illustrated as a conventional grounded grid amplifier, however it will be understood that any other suitable low power amplifier stage may equally well be employed. The output from driver stage 3 is connected to a coupling capacitor 46.

The high power carrier oscillator 4 is illustrated as a magnetron oscillator which is provided with an anode 49 and a centrally positioned cathode 50. Energizing potential for the magnetron is supplied by a battery 51 which is connected between the anode and cathode thereof. A magnet, which is not shown in the drawing, is used to produce the required axial flux. A pickup loop 52 is connected to one of the cavities of the magnetron and feeds through a coaxial transmission line 53. A branch circuit is connected to coaxial line 53 at any convenient point therealong and consists of a quarter wave coaxial transmission line section 54 which terminates in a short circuiting plunger 55. The quarter wave section 54 is tapped near its short circuiting point and another section of coaxial transmission line 56 feeds into this tap from the coupling capacitor 46. It will be apparent that the driver stage 3 supplies energy through coaxial transmission line sections 56, 54 and 53 to the resonant cavities of the magnetron oscillator.

In order to analyze the way in which the high power oscillator is synchronized and the power required to maintain a high power oscillator locked in synchronism with the driver stage, let us first consider the case wherein the driving voltage comprises a frequency modulated carrier wave of center frequency $F_c$ and having a frequency deviation from center frequency, or frequency swing, of $F_d$. Such a system would be desirable for a television sound transmitter wherein a frequency modulated carrier output of high power is required. In such a system the phase modulated driver chains, illustrated in Fig. 1, would not be necessary as an amplitude modulated signal is not required. However, the advantages of the system of Fig. 1 of high power step-up may be obtained in such a frequency modulated system by utilizing a single high power oscillator and locking it in synchronism with a frequency modulated driver stage of relatively low power.

The minimum driving voltage necessary to maintain a synchronous relationship between the driver stage 3 and the high power oscillator 4 may be obtained from the general relationship developed in connection with the use of synchronized oscillators in frequency modulation receivers:

$$E_1E_2\frac{Fd}{Fc}2Q \qquad (1)$$

where, $E_1$=driving voltage
$E_2$=voltage of synchronized oscillator at the point where $E_1$ is measured
$F_d$=frequency deviation
$F_c$=carrier frequency
Q=oscillator effective Q If we assume a center frequency of 628 megacycles, a frequency deviation of 25 kilocycles and an oscillator Q of 1000, which conditions would be suitable for the sound channel of a television transmitter operating in the frequency band of 470 megacycles to 890 megacycles, we have upon substitution in Equation 1 the following ratio of driving voltage to oscillator voltage:

$$\frac{E_1}{E_2}\frac{25\times10^3}{628\times10^6}\times2\times1000$$

Therefore, $$\frac{E_1}{E_2}.08$$

If we now consider the ratio of driving power to oscillator power and assuming the driving voltage and oscillator voltage are produced across an oscillator impedance Z, we have from Ohm's law:

$$\frac{P_1}{P_2}\frac{\frac{E_1^2}{Z}}{\frac{E_2^2}{Z}}\frac{E_1^2}{E_2^2} \qquad (2)$$

where $P_1$=driving power
$P_2$=oscillator output power

Therefore, the ratio of driving power to oscillator power becomes in the numerical example given above:

$$\frac{P_1}{P_2}.0064$$

It is apparent from the numerical example of Equation 2 that an extremely small power output from the driver stage is required to maintain the high power oscillator 4 in synchronism therewith. In the example given for a television sound transmitter, a 100 kilowatt magnetron oscillator may be driven by a .64 kilowatt driver stage.

While the above analysis is satisfactory for a system wherein the driving voltage consists of a frequency modulated carrier wave, a situation entirely suitable when an angle modulated output wave is required, if an amplitude modulated wave is desired; such as is required, for example, in a television picture transmitter, the entire phase modulation system of Fig. 1 may be employed. In order to apply Equation 1 to a phase modulation system such as is illustrated in Fig. 1, we must derive the equivalent ratio of $F_d/F_c$ for phase modulation. The relationship between the phase shift $M_p$ in radians of a phase modulation system and the equivalent frequency deviation $F_d$ of a frequency modulation system is determined by the equation:

$$F_d=M_p\times F_a \qquad (3)$$

where, $F_a$=modulating frequency
$M_p$=phase shift in radians

Substituting Equation 3 in Equation 1 we have:

$$\frac{E_1}{E_2}\frac{M_pF_a2Q}{F_c} \qquad (4)$$

Let us now apply Equation 4 to the phase modulation system of Fig. 1, wherein the maximum phase shift $m_p$ is $\pi/4$ radians. If we assume a maximum modulating frequency of 4 megacycles, which is the upper frequency limit of the conventional television picture signal, a center frequency of 628 megacycles which is again suitable for the picture channel of a television transmitter operating in the ultra-high frequency band, and an effective oscillator Q of 20 for the magnetron oscillator, we have, upon substituting in Equation 4, as the ratio of driving voltage to oscillator voltage the ratio:

$$\frac{E_1}{E_2}\frac{\frac{\pi}{4}\times4\times10^6\times2\times20}{628\times10^6}$$

Therefore, $$\frac{E_1}{E_2}.02$$

Substituting in Equation 2 so as to obtain the ratio of driving power to oscillating power, we have:

$$\frac{P_1}{P_2}.04$$

It is thus apparent that in the numerical example given above for a television picture transmitter a 100 kilowatt magnetron may be driven by a 4 kilowatt driver stage, a step-up of power of twenty-five to one being obtained between the driver and output stages.

In considering Equation 4, it will be apparent that many applications may arise wherein an amplitude modulated signal is required and in which a relatively narrow frequency band is utilized at the source of modulation. In such applications, the Q of high power oscillators, such as the magnetron oscillators illustrated in Fig. 5, may be satisfactory to allow a frequency deviation over the relatively narrow frequency band required by the narrow band modulation voltage. However, in connection with the numerical example given to illustrate the application of Equation 4, a relatively low effective oscillator Q has been assumed so as to provide for synchronization of the high power oscillator over the relatively wide frequency band of 4 megacycles which is required when the television picture signal is used as a source of modulation. In such a situation any high power oscillator having a relatively low effective Q may readily be employed. In the event that a magnetron type of high power oscillator is to be employed, the Q of the magnetron may be conveniently controlled by employing cavities of slightly different dimensions in the magnetron so that each cavity will resonate at a slightly different frequency within the over-all required frequency band. A band pass effect is thus obtained instead of a single resonant frequency. However, it is evident that other methods of controlling the Q of the magnetron oscillator will be apparent to those skilled in the art. Accordingly it will be understood that I do not wish to be limited to such an arrangement, as the arrangement is cited merely for the purpose of illustrating the adaptability of a magnetron oscillator to the wide band application discussed above.

It will be apparent that the same considerations discussed in connection with driver stage 3 and high power oscillator 4 will apply equally well to the relationships of driver stage 6 and high power oscillator 7. In Fig. 5 circuit elements associated with the driver stage 6 and the high power oscillator 7 have been indicated by the same reference numerals as corresponding elements in driver stage 3 and oscillator 4 and therefore, a detailed description thereof is considered unnecessary herein.

Having analyzed the relationships between the driver stages 3, 6 and high power oscillators 4, 7, we may now consider the diplexer circuit 10 wherein the outputs of the high power oscillators 4, 7 are combined. The diplexer unit 10 may be of any well known type and is shown as a lumped circuit type of diplexer. Briefly, the diplexer unit comprises a first input transformer having a primary 60 and a center tapped secondary winding 61. The output of oscillator 4 is connected through coaxial transmission line 53 to the primary winding 60 so that there is produced across secondary 61 the oscillator output voltage from oscillator 4. The diplexer also includes a second input transformer having a primary winding 62 and a secondary winding 63. Secondary windings 61, 63 are tuned to the carrier frequency by means of capacitors 64 and 65. The secondary winding 63 is connected from the center tap of winding 61 to ground. A resistive load circuit 66 is connected from one end of winding 61 to ground and a second resistive load circuit 67 is connected from the other end of winding 61 to ground.

Considering the operation of the diplexer unit just described, the high power oscillator 4 induces in secondary winding 61 a voltage of a polarity indicated by the solid arrows. The induced voltage in winding 61 produces a flow current in the direction of the solid arrows through the load circuits 66, 67. The output voltage from high power oscillator 7 will induce in the secondary winding 63 a voltage in the direction of the dotted arrow and this induced voltage will cause a flow of current through the load circuits 66, 67 in the direction indicated by the dotted arrows. It is evident that the voltage from the two oscillators 4, 7 will add in the resistive load circuit 66 so that the summation of the oscillator voltages will be obtained therein, and the oscillator voltages will subtract in the load circuit 67. Due to the fact that the oscillator inputs are connected in a balanced bridge arrangement substanially no current from one oscillator source will flow through the other oscillator source and there is substantially no interaction between the two high power oscillators.

While it is possible to replace either the resistive load circuit 66 or the resistive load circuit 67, or both of them, by equivalent antenna radiation resistances of a useful character, I have illustrated the useful load circuit as being connected in place of the resistive load circuit 66, the resistive load circuit 67 comprising a dummy antenna from which power is not radiated but is wasted therein in the form of heat. Such an arrangement is necessary for a television picture transmitter operating under present standards wherein peak power must be produced during positive peaks of modulation voltage. The power supplied to load circuit 66 is connected through a pair of vestigial side band filters which are indicated in block diagram form at 68 to an antenna system 72. The side band filters 68 are necessary to obtain the standard television picture side band distribution. The conventional vestigial side band characteristic has been indicated at 69, it being evident that the sloping side thereof is somewhat below the frequency of the carrier $f_c$ to transmit the upper side band, the carrier, and a portion only of the lower side band. The complementary vestigial characteristic curve which is produced by the other vestigial side band filter is illustrated at 70, it being apparent that such characteristic is disposed to transmit that portion of the lower side band suppressed by 69. The output of the complementary side band filter is connected to a side band dissipater 71 which may comprise any form of resistive load circuit wherein the unwanted vestige of the lower side band is dissipated in the form of heat.

As has been stated above, the diplexer unit is provided with two load circuits 66, 67, the load circuit 66 being supplied with the sum of the two oscillator output voltages and the load circuit 67 being supplied with the difference of the two oscillator output voltages. In Fig. 6 there is illustrated vectorially, the load circuit conditions of load circuit 66 during the modulation cycle. Referring to Fig. 6, vector A represents the output voltage from the high power oscillator 4 and vector B represents the oscillator voltage from high power oscillator 7, these vectors being illustrated in their unmodulated positions. On positive modulation, vector A rotates counterclockwise, while vector B rotates clock-wise. At 100% positive modulation the two vectors will lie on the Y-axis and will add arithmetically to a sum value equal to twice that of a single vector. Such a summation value is illustrated by the vector C which is coincident with the Y-axis of the diagram. At the unmodulated position the vector sum will be equal to 1.41 of the value of a single vector and has been indicated by the vector D along the Y-axis. At −100% modulation the two vectors A and B will lie in opposed relation along the X-axis and will produce a combined output of zero at the point E in Fig. 6. As has been discussed more fully in connection with Fig. 1, the vectors A and B will lie at an angle of 45° in the first and second quadrants in their unmodulated positions. This is because the oscillator output voltage is locked into synchronism with the output of the phase modulators so that any phase variation of the outputs thereof is duplicated at high power by the oscillator output voltage.

In investigating the relationships at the load circuit 67, which is supplied with the difference of the two oscillator output voltages, reference is now made to Fig. 7 wherein there is illustrated vectorially the two oscillator output voltages and their variations during the modulation cycle. As we have seen from a discussion of the diplexer circuit, the oscillator output voltage from oscillator 4 is produced across each load circuit with the same polarity so that the vector A of Fig. 7 remains in the same position that it occupies in Fig. 6. However, the output of oscillator 7 is coupled to load circuit 67 with the opposite polarity so that the vector B now falls in the fourth quadrant whereas it occupied the second quadrant in Fig. 6. The two vectors A and B are shown in their unmodulated positions in Fig. 7. During positive modulation the vector A rotates counter-clockwise and the vector B rotates clockwise. At 100% positive modulation the two vectors will lie in opposed relation along the Y-axis and the summation of vectors A and B will be equal to zero as is illustrated by the point C of Fig. 7. At zero modulation the vectors A and B combine to give a resultant which will be 1.41 of the value of a single vector and will lie along the X-axis as is indicated by the vector D. At —100% modulation the vectors will lie along the X-axis and will add to produce a peak amplitude of twice the value of a single vector as is indicated by the vector E.

It is evident from the comparison of Figs. 6 and 7 that the total output of the diplexer unit is constant, the power merely shifting from one load circuit of the diplexer unit to the other load circuit of the diplexer unit according to the modulation cycle. It is also evident from Fig. 6 that the output from load circuit 66, which is supplied to the antenna system, contains no phase modulation. That is, the summation of vectors A and B always coincides with the Y-axis and varies from an amplitude of zero to an amplitude of twice the value of the individual vectors during the modulation cycle. The same condition is also met by the output voltage from diplexer load circuit 67 shown in Fig. 7, although the same is rotated 90° from the output of Fig. 6. There is thus obtained from two phase modulated high power sources, which are operating at constant amplitude, an amplitude modulated carrier wave of a peak power output which is equal to the sum of the power outputs of the two sources. It should be emphasized that at the positive peak of modulation there is substantially no power being dissipated in the load circuit 67, all of the power output of the two high power oscillators 4, 7 being supplied to the antenna system.

Inasmuch as the amplitude modulated signal is obtained by taking components of the rotating vectors which are proportional to the sine or cosine of the rotating vectors, it is to be expected that the modulation characteristic curve of the system is in the form of a sinusoidal function. The modulation characteristic of the system has been illustrated in Fig. 8 wherein the modulation curve 75 is in the form of a portion of a sine wave from zero to 90°. The voltage supplied to the modulation system is indicated along the abscissa and the voltage output from the diplexer unit is indicated along the ordinate. It is evident that the modulation curve 75 is substantially linear up to 75% of maximum output, but departs considerably from linearity between 75% and 100% of maximum output.

If the system is to be used for a television picture transmitter wherein an amplitude modulated carrier wave of high power is required, the non-linearity in the above mentioned portion of the modulation characteristic may be used for synchronizing signals which carry no gradations and so the non-linearity in this region will be of no practical consequence. In Fig. 8 there has been illustrated a typical television picture signal modulation voltage which is indicated by the wave form 76 and which may be applied to the modulator system. It will be noted that the synchronizing signals 77, which form a part of the composite television signal 76, have been increased in amplitude relative to the total amplitude of the composite signal. This is necessary so as to produce in the output of the modulator system a synchronizing pulse height which is 25% of the total amplitude of the composite signal, as is required by present day television standards.

It is evident that the required "stretching" of the synchronizing pulses may be obtained by reference to the sinusoidal shape of the modulation curve. If the peak to peak modulating signal is 1.0, the synchronizing pulses will occupy 46% of this range to produce 25% synchronizing pulse modulation in the output. This is readily apparent when it is realized that the arc sine of .75 is 48.6 degrees, leaving 41.4 degrees to go to 90 degrees; therefore, 41.4/90 equals .46, the percentage required for synchronizing pulses. If there is a slight depression in the deep black region of the picture signal, the black components of the picture may also be stretched a trifle to correct for this condition. It will be apparent that the increased amplitude of synchronizing pulses may conveniently be done in the pulse generator which generates the synchronizing pulses, as will be apparent to those skilled in the art. The composite signal from the modulation system is indicated by the wave form 78, this wave form giving the required ratio of synchronizing pulse amplitude to total amplitude of the picture signal.

While I have illustrated the modulation system in connection with a television picture transmitter wherein an amplitude modulated carrier wave of high power is required, it is evident that the modulation system may also be employed in situations wherein sine wave modulation, such as voice modulation is employed. In such situations a suitable fixed bias is applied to the phase modulators so that the vectors A, B of Fig. 6 in their unmodulated positions are angularly separated sufficiently to give a resultant voltage along the Y-axis which is equal to the value of a single vector A or B. Predistorted modulation is then fed into the phase modulators so as to produce symmetrical modulation of the output voltage. The distortion required for the modulation signal is such as to produce a ratio of 2 to 1 between the positive and negative modualtion peaks of the modulation voltage. Such a predistorted modulation signal may conveniently be obtained by employing remote cutoff amplifier tubes as the audio amplifiers and choosing the static bias point and peak swing of the audio signals so as to satisfy the above requirements. Some over-all negative feedback may also be employed in the amplifier of such a predistorted modulation system so as to correct for minor irregularities in the over-all characteristics.

From the foregoing, it is seen that the invention makes it possible to provide an amplitude modulated carrier output wave of relatively high power which may be directly crystal controlled at the carrier frequency. With such a system, high power, ultra-high frequency oscillators, such as the magnetron oscillator and the like which have previously been considered unsatisfactory for amplitude modulation operation, may be operated at a constant amplitude in a modulation system in which an amplitude modulated output wave is produced, the peak power of the amplitude modulated output wave being equal to the sum of the power outputs of the oscillators employed. Also, by the invention, a high power angle modulated carrier wave may be produced from a very low power angle modulated driver source by employing a free running, high power carrier wave oscillator and synchronizing the same by the driver source so that the angle modulation of the low power driver source is reproduced at high power in the output of the carrier wave oscillator.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent in the United States is:

1. The method of producing an amplitude modulated carrier wave which comprises the steps of, producing a pair of carrier waves, phase modulating said carries waves in opposite senses, producing a pair of output waves, synchronizing said output waves with said phase modulated carrier waves and combining said synchronized output waves to produce said amplitude modulated wave.

2. The method of obtaining an amplitude modulated carrier wave which comprises the steps of, producing a pair of carrier waves, phase modulating said carrier waves in opposite senses, generating a pair of output waves of carrier frequency, synchronizing said output waves with said phase modulated carrier waves, and combining said synchronized output waves to derive a useful output therefrom.

3. The method of obtaining an amplitude modulated carrier wave comprising the steps of, producing a pair of low power waves, phase modulating one of said low power waves in a first sense to derive a first phase modulated wave, phase modulating the other of said low power waves in an opposite sense to derive a second phase modulated wave, producing a pair of high power waves of carrier frequency, synchronizing said high power waves with said first and second phase modulated waves, and combining said synchronized high power waves to obtain a high power amplitude modulated wave.

4. The method of obtaining an amplitude modulated carrier wave comprising the steps of, producing a pair of low power waves of carrier frequency, phase modulating one of said low power waves in a first sense, phase modulating the other of said low power waves in an opposite sense, producing a pair of high power waves of carrier frequency, synchronizing said high power waves with said oppositely sensed phase modulated waves, and combining said synchronized high power waves to obtain a high power amplitude modulated wave.

5. The method of obtaining an amplitude modulated carrier wave comprising the steps of, producing a pair of crystal controlled carrier waves, phase modulating one of said carrier waves in a first sense to derive a first phase modulated wave, phase modulating the other of said carrier waves in an opposite sense to derive a second phase modulated wave, producing a pair of output waves of carrier frequency, synchronizing said output waves with said first and second phase modulated waves, and combining said synchronized output waves to obtain an amplitude modulated carrier wave.

6. The method of obtaining an amplitude modulated carrier wave comprising the steps of, producing a pair of low power waves, phase modulating said low power waves in opposite senses to obtain a pair of phase modulated low power waves, generating a pair of high power waves of carrier frequency, locking said high power waves in synchronism with said phase modulated low power waves, and combining said synchronized high power waves thereby to produce an amplitude modulated carrier wave.

7. The method of producing an angle modulated output wave which comprises the steps of, producing a carrier wave, angularly modulating said carrier wave, independently generating an output wave of carrier frequency, and synchronizing said output wave with said angle modulated carrier wave.

8. The method of obtaining a high power angle modulated carrier wave which comprises the steps of, generating a low power carrier wave, modulating in angle said low power carrier wave, independently generating an output wave of carrier frequency, and synchronizing said output wave with said modulated control wave thereby to obtain a high power angle modulated carrier wave.

9. An amplitude modulation system comprising, a control oscillator, a source of modulation voltage, means for obtaining from said oscillator a pair of carrier waves modulated in opposite senses in accordance with said modulation voltage, a pair of carrier wave oscillators, means for synchronizing said carrier wave oscillators with said phase modulated control waves, and means for combining said synchronized carrier wave oscillators thereby to obtain an amplitude modulated output wave.

10. An amplitude modulation system comprising, a crystal controlled oscillator, a source of modulation voltage, means for obtaining from said oscillator a pair of carrier waves phase modulated in opposite senses in accordance with said modulation voltage, a pair of carrier wave oscillators, means for synchronizing said carrier wave oscillators with said phase modulated carrier waves, and diplexing means for combining said carrier wave oscillators thereby to obtain an amplitude modulated carrier wave.

11. An amplitude modulation system comprising a crystal controlled oscillator, a source of modulation voltage, means for obtaining from said crystal controlled oscillator a pair of carrier waves phase modulated in opposite senses in accordance with said modulation voltage, a pair of high power oscillators, means for synchronizing said high power oscillators with said phase modulated carrier waves, a pair of load impedances, and diplexing means for obtaining sum and difference waves across said load impedances without interaction between said high power oscillators, and means for utilizing the voltage produced across at least one of said load impedances.

ROBERT B. DOME.

REFERENCES CITED

The following references are of record in the file of this patent:

UNITED STATES PATENTS

| Number | Name | Date |
|---|---|---|
| 1,673,002 | Fearing | June 12, 1928 |
| 2,172,107 | Plebanski | Sept. 5, 1939 |